US006634495B2

(12) United States Patent  (10) Patent No.: US 6,634,495 B2
Hass  (45) Date of Patent: Oct. 21, 2003

(54) MODULAR STORAGE SYSTEM FOR RECORDING MEDIA (75) Inventor: Janice B. Hass, Bethlehem, CT (US)

(73) Assignee: Ivy Hill Corporation, New York, NY (US)

( * ) Notice: Subject to any disclaimer, the term of this patent is extended or adjusted under 35 U.S.C. 154(b) by 119 days.

(21) Appl. No.: 09/944,325

(22) Filed: Aug. 31, 2001

(65) Prior Publication Data

US 2003/0042156 A1 Mar. 6, 2003

(51) Int. Cl.[7] ................................................ B65D 85/57
(52) U.S. Cl. ..................................... 206/312; 206/308.1
(58) Field of Search .............................. 206/308.1, 310, 206/311, 312, 307, 309

(56) References Cited

U.S. PATENT DOCUMENTS

| 903,232 A | 11/1908 | Rosenthal |
| 1,356,815 A | 10/1920 | Foresman |
| 3,826,360 A | 7/1974 | Shore |
| 4,444,314 A | 4/1984 | Jacobsson |
| 4,709,812 A | 12/1987 | Kosterka |
| 4,762,225 A | 8/1988 | Henkel |
| 5,085,318 A | 2/1992 | Leverick |
| 5,099,995 A | 3/1992 | Karakane et al. |
| D332,005 S | 12/1992 | Walasek |
| 5,199,743 A * | 4/1993 | Rosinski, III ................. 281/45 |
| 5,246,107 A | 9/1993 | Long et al. |
| 5,263,581 A | 11/1993 | Rosen |
| 5,289,918 A | 3/1994 | Dobias et al. |
| 5,332,089 A * | 7/1994 | Tillett et al. ................. 206/310 |
| 5,333,728 A | 8/1994 | O'Brien et al. |
| 5,513,749 A | 5/1996 | Simmons |
| 5,575,387 A * | 11/1996 | Gelardi ..................... 206/308.1 |
| 5,655,656 A | 8/1997 | Gottlieb |
| 5,682,990 A | 11/1997 | Schluger |
| 5,713,462 A | 2/1998 | Hansen |
| 5,779,038 A | 7/1998 | Herr et al. |
| 5,823,333 A | 10/1998 | Mori |
| 5,931,293 A | 8/1999 | Scclenmeyer |
| 5,931,295 A | 8/1999 | Kaupp |
| 6,036,008 A | 3/2000 | Hutton |
| 6,068,116 A | 5/2000 | Bankhead |
| 6,106,015 A | 8/2000 | Udwin et al. |
| 6,186,320 B1 | 2/2001 | Drew |
| 6,241,085 B1 | 6/2001 | Koehn |
| 6,360,887 B1 * | 3/2002 | Pettey ......................... 206/232 |
| 6,375,003 B1 | 4/2002 | Lethen et al. |
| 6,443,301 B2 | 9/2002 | Garnier |

FOREIGN PATENT DOCUMENTS

WO   WO 94/01866   1/1994

* cited by examiner

Primary Examiner—David T. Fidei
(74) Attorney, Agent, or Firm—Amster, Rothstein & Ebenstein (57) ABSTRACT A modular storage system for recording media, includes a plurality of folders and a plurality of slipcases for storing at least one folder. Each folder has orthogonal outer dimensions in common with each other folder, and each individual folder is formed from a single paperboard blank and capable of storing therein at least one recording media. Each folder defines a plurality of panels, at least one of the panels being capable of storing a recording media, and the panels being laterally turnable like the pages of a book. Each folder is characterized by the absence of any additional member joining together the panels.

54 Claims, 9 Drawing Sheets

MODULAR STORAGE SYSTEM FOR RECORDING MEDIA

BACKGROUND OF THE INVENTION

The present invention relates to a modular storage system for recording media, and more particularly to such a system including a plurality of folders of similar size and configuration for holding one or more recording media and one or more slipcases in which such folders are stored.

For ecological reasons relating to the difficulty in recycling plastic (relative to paperboard), it is presently highly desirable-and in fact may one day be legally required-that a storage system for recording media, such as a compact disk (CD), CD-ROM, and the like, be plastic-free and essentially composed only of paperboard.

The public is familiar with conventional books formed of a plurality of leaves or sheets for successive reading of the pages on each side thereof by turning of the leaves laterally, one at a time, from left to right. It is thus desirable that a storage system for recording media have folders which are book-like in appearance and usable like a book, but with recording media storable on one or both pages of a leaf. The inner pages of the two outer leaves and both pages of the inner leaves would be available for storage of the recording media, for printed matter (such as instructions for use of the recording media, promotional material, biographical or background material relating to the subject matter of the recording, and the like) or both. The outer pages of the two outer leaves would be available only for printed matter. Of course, the presence of a recording media on a particular page may decrease the availability of space on that page for printed matter. Accordingly, it is desirable for such a book-like folder to have six pages formed by three leaves so that it is capable of storing anywhere from one to four recording media (one per page, excluding the outer pages).

For manufacturing economy, each individual folder should be formed from a single longitudinally extending paperboard blank. Thus, there will be no need for additional material, such as a backing or binder, to join together the various leaves of the folder. This avoids both the expense of additional material and the expense of the manufacturing operation which would be required to secure the additional material to the leaves.

Finally, in order to appeal to the consumer, the storage system should be modular in design. Thus each of the folders, whether designed to hold one, two, three or four recording media, should be of the same orthogonal outer dimensions (that is, each folder having the same height, the same width and the same depth as the other folders). Because the folders are modular, one or the same plurality of folders would be capable of fitting into any of a plurality of folder-receiving slipcases having common orthogonal inner and outer dimensions. On the other hand, if desired, the slipcases may have the same height and width dimensions (inner and outer) as the other slipcases, but differ in the third dimension (i.e., depth or thickness) so that the various slipcases may be able to receive one, two or three folders. Assuming that a given slipcase holds three folders, it can then hold up to twelve CDs (up to four CDs per folder).

In the service of modularity, the various folders should apparently be of the same configuration and dimensions, differing only in the number of recording media each contains or can contain (or the number of slits or apertures provided therein to retain such number of recording media). Such apparent modularity is not the same thing as actual modularity. For example, the actual construction of a particular folder panel may differ from one folder to another so long as it appears to be the same to the typical user. On the other hand, actual modularity is even more desirable because it reduces manufacturing costs if all folders have the same or substantially the same construction (i.e., differ only in the number of slits or apertures provided to receive recording media). Indeed, in the interest of achieving the manufacturing economies of scale afforded by actual modularity, it is not unknown to increase material and construction costs by using the materials and construction used in the most expensive product in even the cheaper products where the same are not required.

Accordingly, it is an object of the present invention to provide a modular storage system for recording media which in a preferred embodiment is eco-friendly and eschews the use of plastic.

Another object is to provide such a system wherein in one preferred embodiment the folder is book-like in appearance and in the way that the leaves are turned laterally.

A further object is to provide such a system wherein in one preferred embodiment the folder is formed from a single longitudinally extending paperboard blank without requiring any additional material to maintain together the various leaves.

It is also an object of the present invention to provide such a system which in one preferred embodiment affords apparent modularity.

It is another object to provide such a system which in one preferred embodiment uses substantially modular folders and substantially modular slipcases.

SUMMARY OF THE INVENTION

It has now been learned that the above and related objects of the present invention are obtained in a modular storage system for recording media. The system comprises a plurality of folders and a plurality of slipcases. Each folder has orthogonal outer dimensions in common with each other folder. Each individual folder is formed from a single paperboard blank and is capable of storing therein at least one recording media. Each folder defines a plurality of panels, at least one of the panels being capable of storing a recording media, and the panels being laterally turnable like the pages of a book. Each folder is characterized by the absence of any additional member joining together the panel. Each slipcase has at least two perpendicular outer dimensions in common with each other slipcase, and each slipcase is configured and dimensioned to store therein at least one of the folders.

In a preferred embodiment, each folder defines a front panel and a back panel, the front and back panels cooperatively contributing to define a spine directly connecting the front and back panels. At least one of the folders is capable of storing therein a different number of recording media than at least one other of the folders, and at least one of the slipcases is configured and dimensioned to store therein a plurality of the folders. At least one of the slipcases has a third perpendicular outer dimension different from a third perpendicular outer dimension of at least one other of the slipcases.

Preferably in one embodiment, each individual folder is capable of storing therein N recording media where N=1, 2, 3 or 4. Each folder defines three laterally aligned panels consisting of a front panel, a back panel and an intermediate panel disposed intermediate the front and back panels. The front and back panels cooperatively define a spine directly connecting the front and back panels, each of the front and back panels being of double blank thickness and the intermediate panel being of at least double blank thickness. The panels are defined exclusively by lateral folding of the blank about transverse foldlines.

Preferably in another embodiment, each folder defines at least two laterally aligned panels including a front panel and a back panel. The front and back panels cooperatively contribute to define a spine directly connecting the front and back panels, each of the front and back panels being of double blank thickness, and at least one of the front and back panels being capable of storing a recording media. The panels are defined exclusively by folding of the blank about foldlines.

The present invention also encompasses a modular storage system for recording media comprising at least one folder and at least one slipcase. Each folder has orthogonal outer dimensions in common with each other folder, and each individual folder is formed from a single paperboard blank and is capable of storing therein at least one recording media. Each folder defines at least two laterally aligned panels including a front panel and a back panel. The front and back panels cooperatively contribute to define a spine directly connecting the front and back panels, each of the front and back panels being of double blank thickness. At least one of the front and back panels is capable of storing a recording media. The panels are defined exclusively by folding of the blank about foldlines, and the panels are laterally turnable like the pages of a book. Each folder is characterized by the absence of any additional member joining together the panels. Each slipcase has at least two perpendicular outer dimensions in common with each other slipcase, and each slipcase is configured and dimensioned to store therein at least one of the folders.

In a preferred embodiment, at least one folder defines three laterally aligned panels including an intermediate panel disposed intermediate the front and back panels. The intermediate panel is of at least double blank thickness and is only indirectly connected to the spine. The panels are defined exclusively by folding of the blank about transverse foldlines. The spine is of only single blank thickness. The three orthogonal outer dimensions of each folder are height, width and thickness.

The two perpendicular outer dimensions of each slipcase are height and width, thickness optionally varying. At least one slipcase is configured and dimensioned to store therein a plurality of the folders.

The modular storage system may comprise a plurality of the folders of and a plurality of the slipcases.

The present invention further encompasses a modular storage system for recording media wherein each individual folder is capable of storing therein N recording media where N=1, 2, 3 or 4. Each such folder defines three laterally aligned panels consisting of a front panel, a back panel and an intermediate panel disposed intermediate the front and back panels. The front and back panels cooperatively define a spine directly connecting the front and back panels, each of the front and back panels being of double blank thickness and the intermediate panel being of at least double blank thickness. At least one of the panels is capable of storing at least one recording media.

In a preferred embodiment, the intermediate panel is only indirectly connected to the spine and is capable of storing at least one recording media, preferably one recording media on each side thereof. Preferably, each of the front and back panels is capable of storing one recording media on an inner face thereof, and the intermediate panel is capable of storing one recording media on each outer face thereof.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Referring now to the drawing, and in particular to FIGS. 1–4 thereof, therein illustrated is a modular storage system according to the present invention, generally designated by the reference numeral 10. The system 10 is designed to store any of a wide variety of substantially thin recording media 12 such as compact discs (CDs), CD-ROMs, DVDs, or the like, whether circular or rectangular in plan, whether centrally apertured or imperforate.

Figure 4:
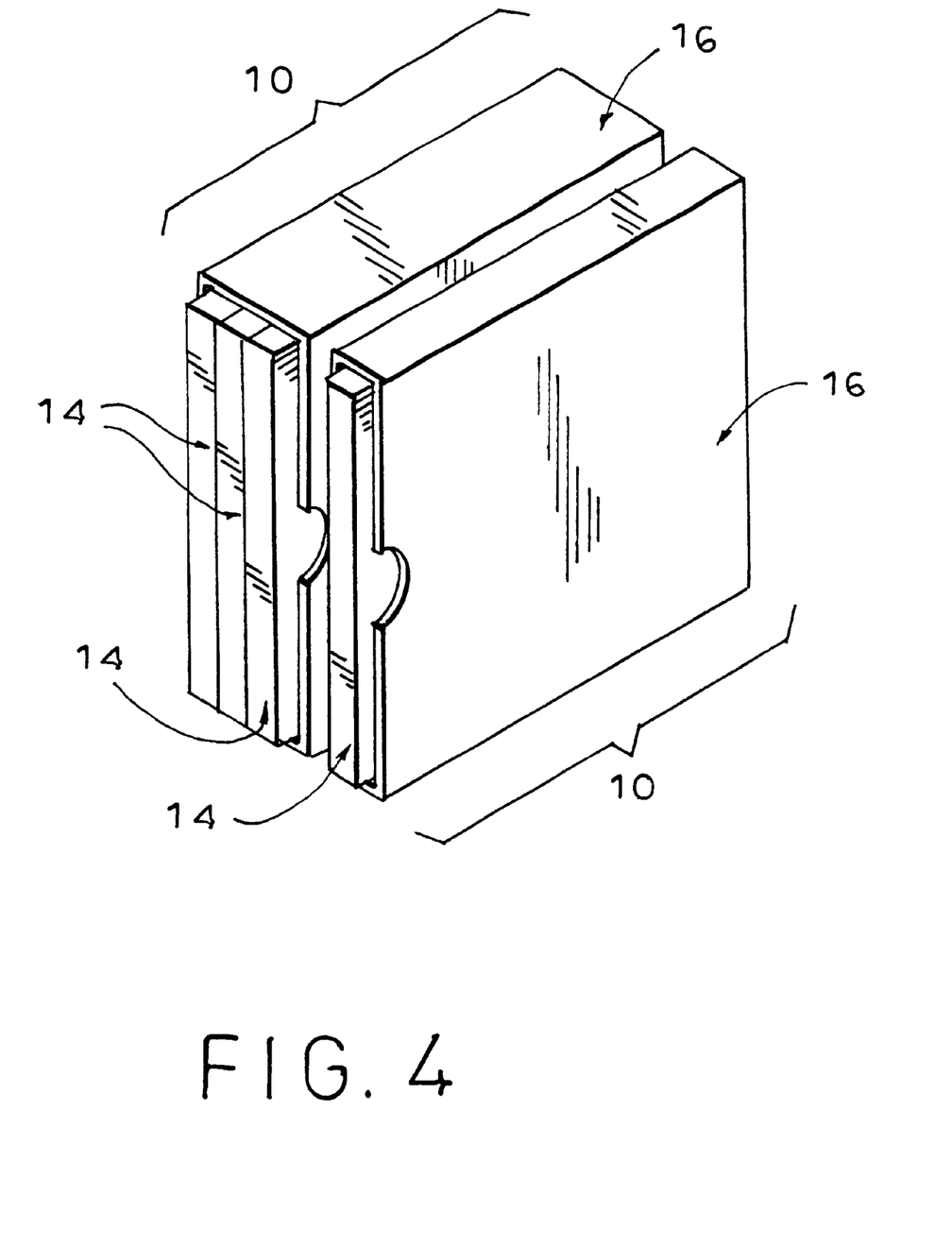
FIG. 4 is an exploded view of a modular storage system according to the present invention using the two panel folder embodiment.

Broadly speaking, as illustrated in FIG. 4, the system 10 comprises at least one two panel folder, generally designated 14, and at least one slipcase, generally designated 16. Preferably the system comprises a plurality of the folders 14 and a plurality of the slipcases 16. Each folder 14 has orthogonal outer dimensions (that is, height, width and thickness) in common with each other folder 14.

Figure 2:
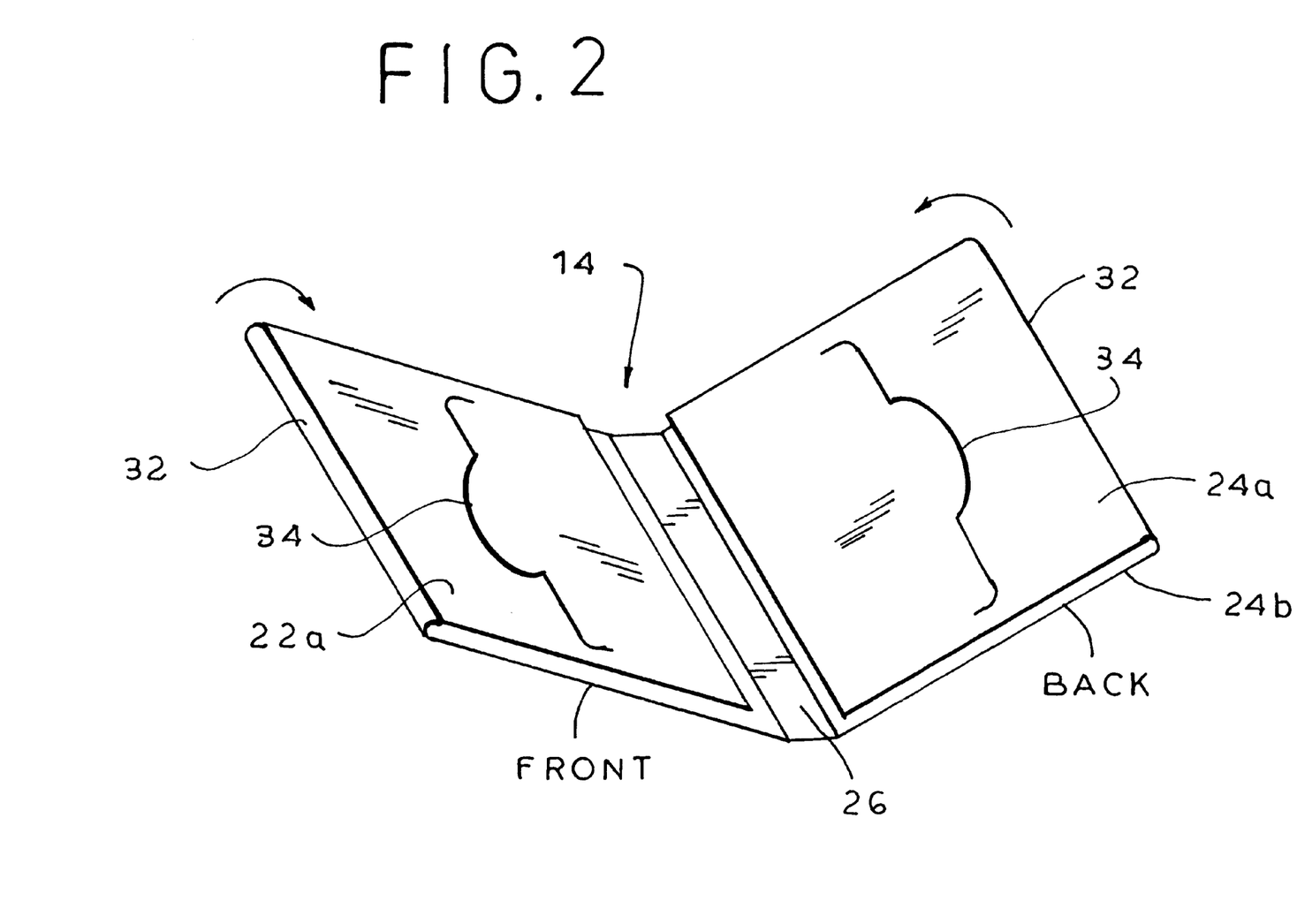
FIG. 2 is an isometric view of the blank folded into the folder configuration.
Figure 3:
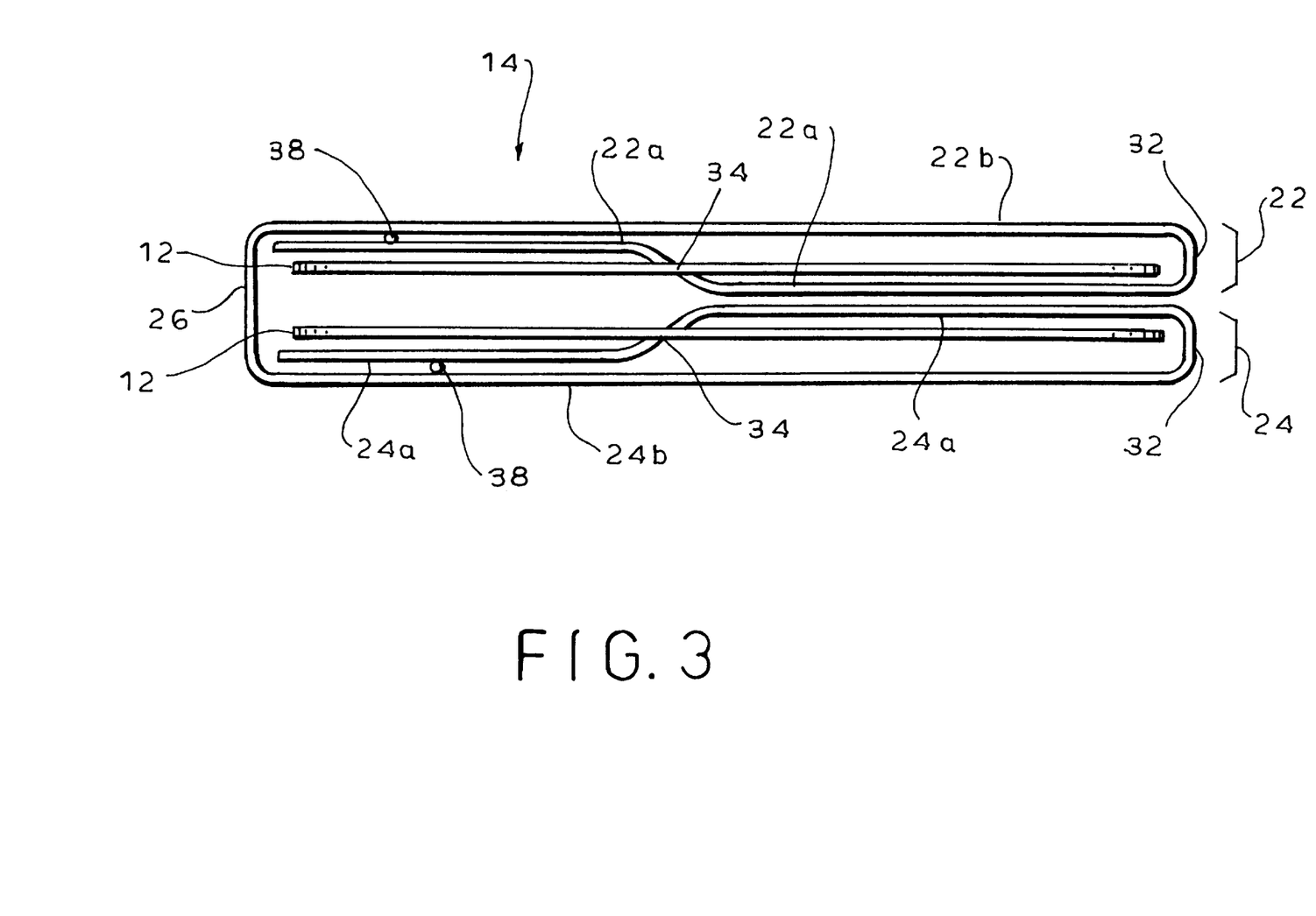
FIG. 3 is a top plan view of the folder with a top portion thereof removed to reveal details of internal construction, two recording media in the form of CD's being illustrated as stored therein.

Referring now to FIGS. 2–3 in particular, each individual folder 14 is formed from a single paperboard blank (described hereinafter) and is capable of storing therein at least one recording medium 12. Further, each folder 14 defines a plurality of panels 20, the panels 20 being laterally turnable like the leaves or pages of a book. At least one of the panels 20 is capable of storing a recording medium 12 herein illustrated as a CD. Each folder 14 is characterized by the absence of any additional member joining together the plurality of panels 20.

As illustrated in FIG. 4, each slipcase 16 has at least two perpendicular inner and outer dimensions in common with each other slipcase (namely, height and width), although the several slipcases may differ in the third perpendicular inner and outer dimension (namely, thickness). Each slipcase 16 is configured and dimensioned to store therein at least one of the folders 14, the exact number of folders 14 storable by any given slipcase 16 being dependent upon the thickness of that particular slipcase. Preferably at least one of the plurality of slipcases 16 has a thickness different from the thickness of another one of the slipcases 16 so that the various slipcases can store different numbers of folders. Optimally, the slipcases 16 can store from one to three folders 14.

Returning now to the folders 14, each folder 14 defines a front panel 22 and a back panel 24. The front panel 22 acts as a front cover and the back panel 24 acts as a back cover. The front and back panels 22, 24 cooperatively contribute to define a spine 26 directly connecting the front and back panels 22, 24 at their adjacent transverse edges. Optimally at least one of the folders 14 is capable of storing therein a different number of recording media 12 than another of the folders 14, the separate folders being configured and dimensioned to store either one or two recording media 14. Because the spine 26 defined between the front and back panels 22, 24 extends a fixed width, without regard to the number of recording media 12 contained in the folder 14, and defines the thickness of the folder 14, a given slipcase 16 holds a given number of folders 14 without regard to the number of recording media 12 disposed within such folders 14.

When a plurality of the slipcases 16 are stacked side-by-side in an upright orientation on a storage or display shelf, essentially only the folder spines 26 are visible to a viewer, the actual front and back walls of the slipcase 16 being of negligible thickness relative to the folder spines 26. Accordingly, the viewer sees only a regular disposition of spines 26 side-by-side, thereby providing a modular impression, even though in fact each slipcase 16 may hold a different number of folders 14 and each folder 14 may hold a different number of recording media.

In order to achieve economies of scale, preferably the folder 14 is used regardless of whether one or two recording media 12 are to be stored therein. Thus preferably essentially only one folder 14 is manufactured and used for one or two recording media. In this instance, the folder 14 is provided only with as many slits 34 (that is, one or two) as necessary to accommodate the contemplated number of recording media 12. The slight variance from one folder 14 to another folder 14 (depending upon whether there are one or two slits 34 therein) represents only a minor variation and does not seriously detract from the economies of scale achieved by producing essentially only one folder 14, regardless of whether one or two recording media are to be stored therein.

Figure 1:
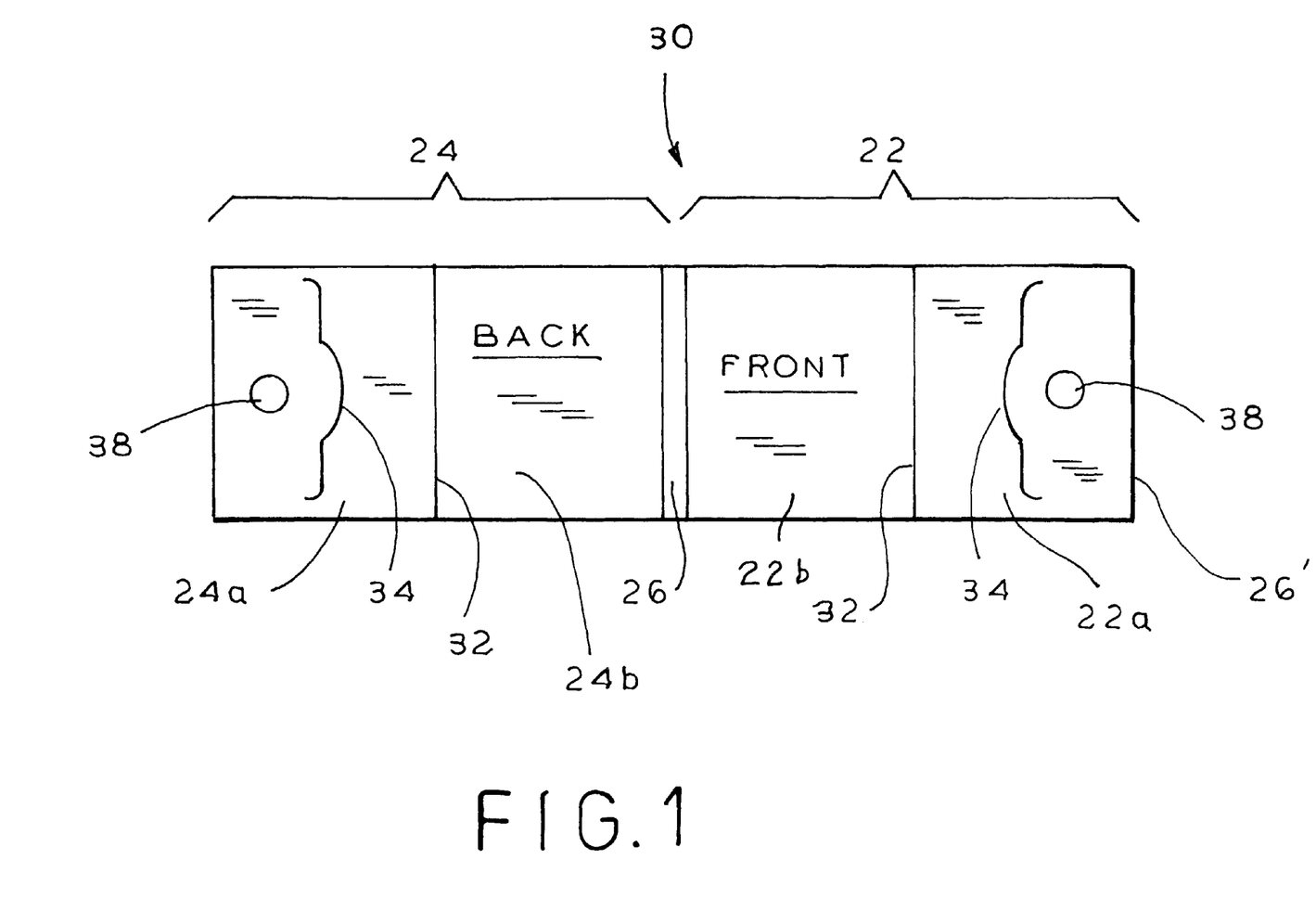
FIG. 1 is a top plan view of a single paperboard blank from which the two panel folder embodiment is formed.

Referring now to FIG. 1 in particular, each folder 14 is formed from a single paperboard blank, generally designated 30. Each of the laterally aligned front and back panels 22, 24 is of double-blank thickness, the panels 22, 24 being formed by folding the blank 30 exclusively along transverse foldlines 32 and then partially gluing together blank flap pairs 22a, 22b and 24a, 24b, respectively. Thus there are no longitudinal foldlines, and no panels formed by folding one blank flap upwardly or downwardly relative to another single blank thick flap. The front and back panels 22, 24 cooperatively contribute to define the spine 26 directly connecting the front and back panels 22, 24, with the spine 26 being of only single blank thickness. The width of the spine 26 is selected to accommodate the combined thicknesses of the front and back panels 22, 24 plus the number of recording media 12 contemplated for storage therein (up to two recording media 12).

To form the double thickness front panel 22, glue 38 (schematically represented by a circle) is applied strategically (above slit 34) to the blank flap 22a, which is then folded laterally over the blank flap 22b. To form the back panel 24, glue 38 is applied strategically (above slit 34) to the blank flap 24a, which is then folded over the blank flap 24b. Blank flaps 22a, 24a are sized so that they do not extend over the spine 26 between blank flaps 22b, 24b. Prior to folding, as afore described, blank flaps 22a, 24a will be cut to define a slit or aperture 34 therethrough so that each of the panels 22, 24 can receive a storage medium 12. Each slit 34 is of sufficient height and width to enable passage of at least a portion of a recording medium 12 therethrough, preferably the widest portion. The transverse folds 32 between blank flaps 22a, 22b and between blank flaps 24a, 24b limit passage of the recording media 12 through the slits 34 so that the panels 22, 24 are capable of containing and storing the recording media 12 placed therein.

Where the recording media 12 have a particularly sensitive side (such as the underside of a CD or CD-ROM), the recording media are inserted into the slits 34 such that the sensitive sides face the respective panels into which they are being inserted and only the relatively insensitive sides (for a CD, the top side) directly oppose one another.

Referring now to FIGS. 5–9 in particular, therein illustrated is a particularly preferred embodiment 14' of a folder according to the present invention formed from a blank 30'. In the preferred embodiment 14', each folder is capable of storing therein N recording media, where N=1, 2, 3 or 4. An intermediate panel 40 is disposed intermediate the front and back panels 22, 24. The intermediate panel 40 is of at least double blank thickness. The intermediate panel 40 is formed by strategically applying glue (above slit 34) to one blank flap 40b and then folding the blank flap 40a over blank flap 40b to form the double thickness intermediate panel 40.

Figure 5:
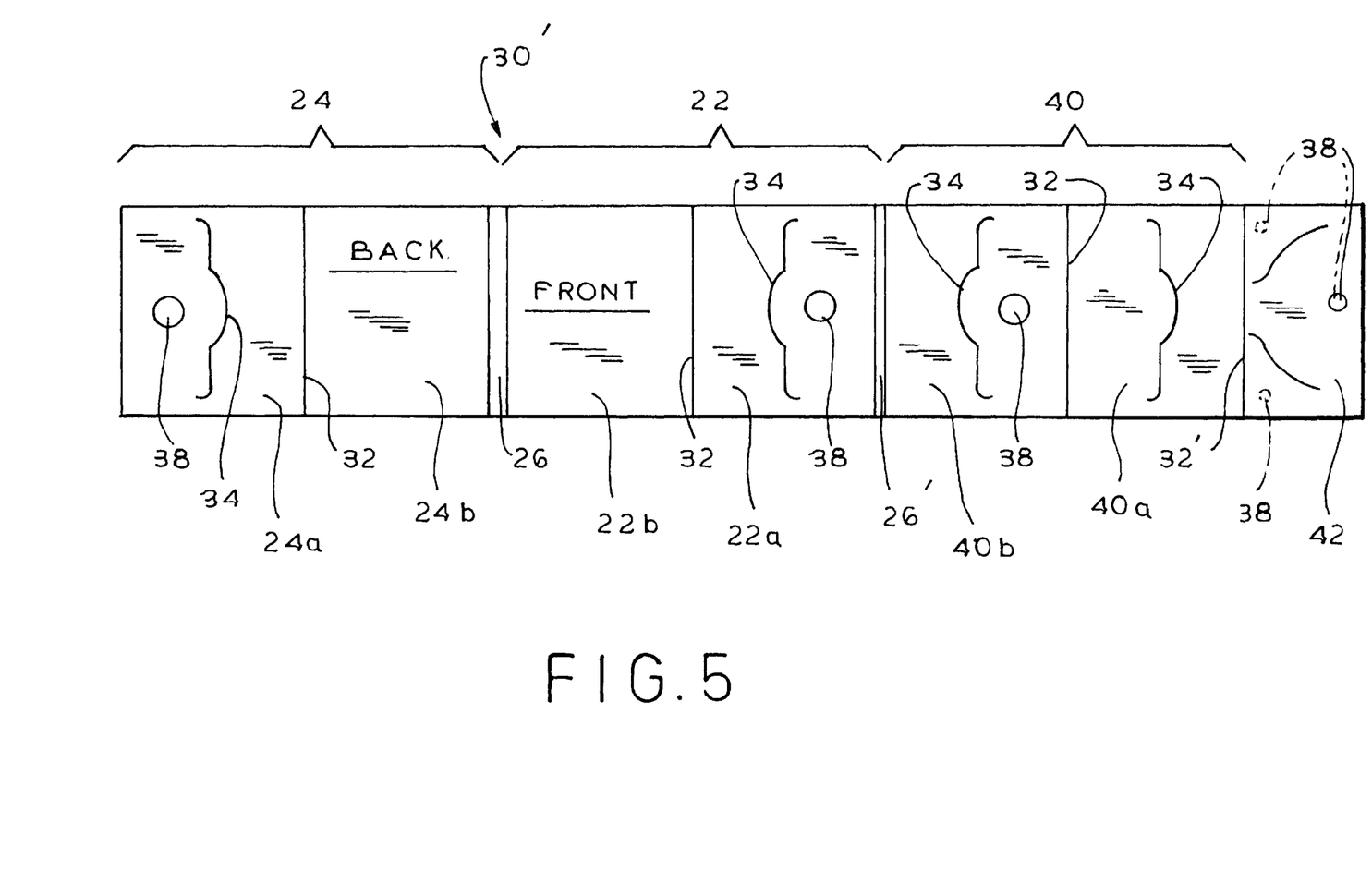
FIG. 5 is a top plan view of a single paperboard blank from which the three panel folder embodiment is formed.
Figure 6:
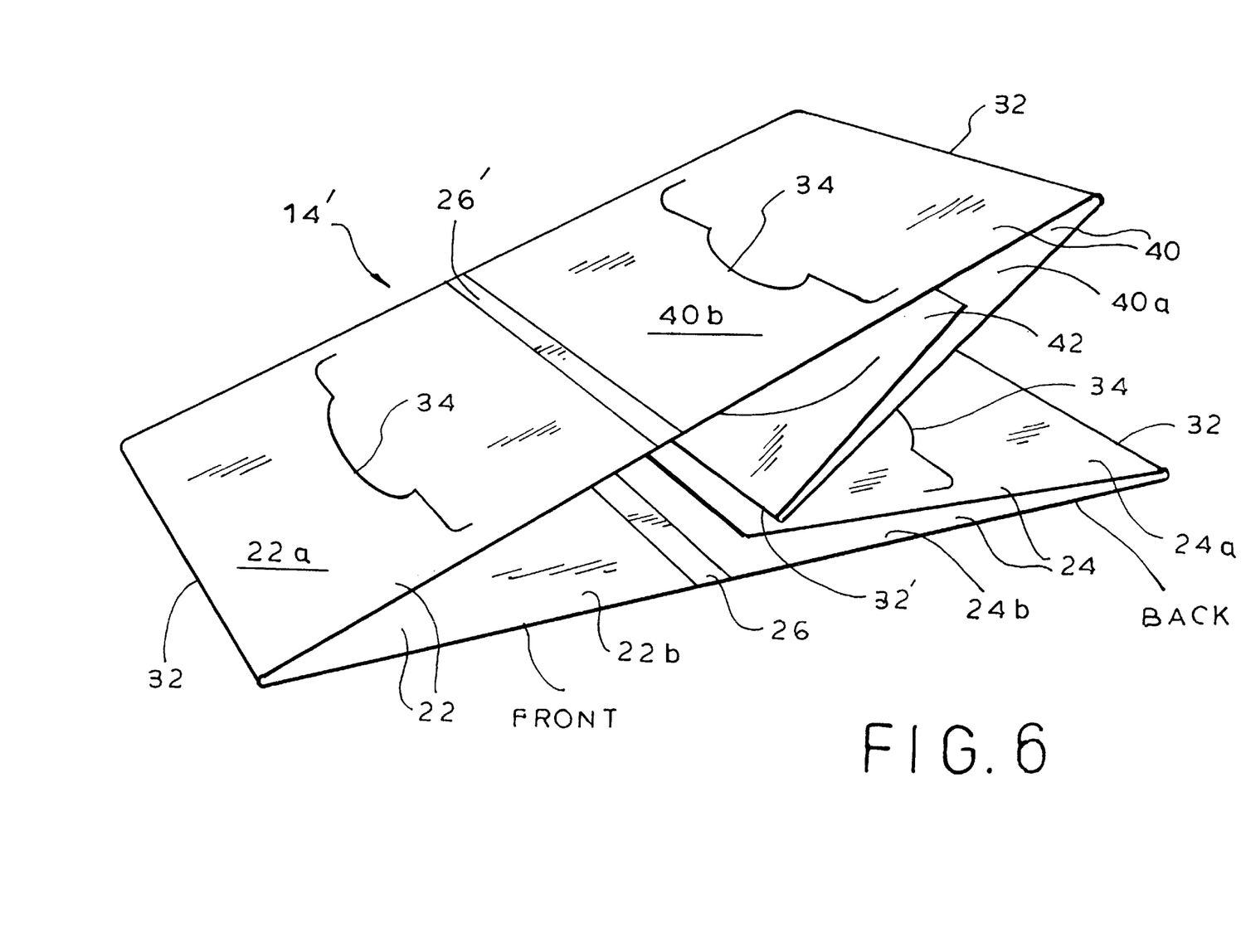
FIG. 6 is an isometric view of the blank partially folded into the folder.
Figure 7:
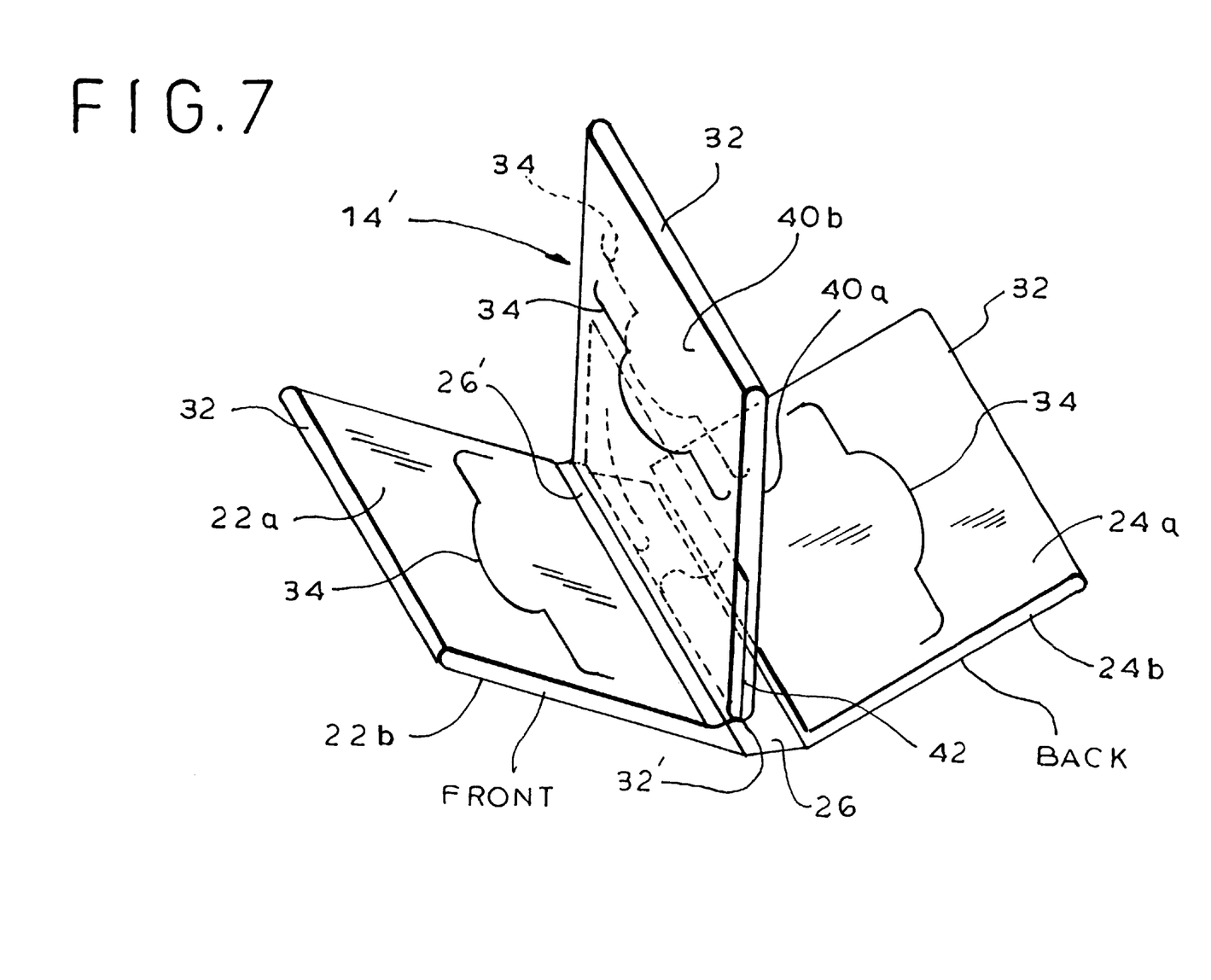
FIG. 7 is an isometric view of the fully formed folder.

Preferably the intermediate panel 40 is only indirectly connected to the spine 26—that is, it is connected to the spine 26 only through the front panel 22. The intermediate panel 40 is connected to the front panel 22 (and more particularly, the blank flap 40b is connected to the blank flap 22a) by a second spine 26'. The second spine 26' is typically thin (preferably only 3/16") relative to the first spine 26 (preferably 7/16"). The second spine 26' allows free pivoting of the intermediate panel 40 relative to front panel 22 even when there are recording media 12 in both panels 22, 40.

Figure 8:
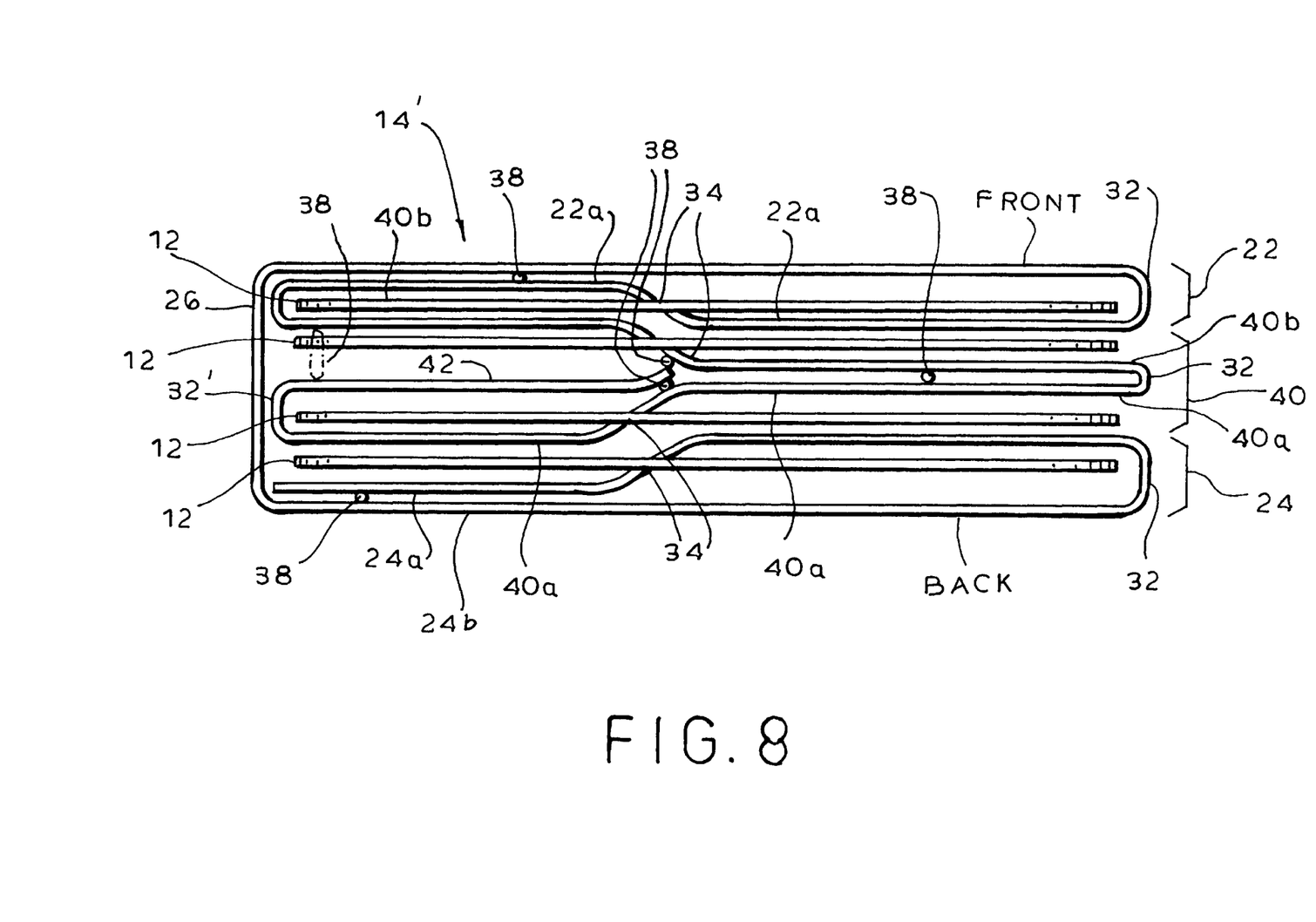
FIG. 8 is a top plan view of the folder with a top portion thereof removed to reveal details of internal construction, four recording media in the form of CD's being illustrated as stored therein.
Figure 9:
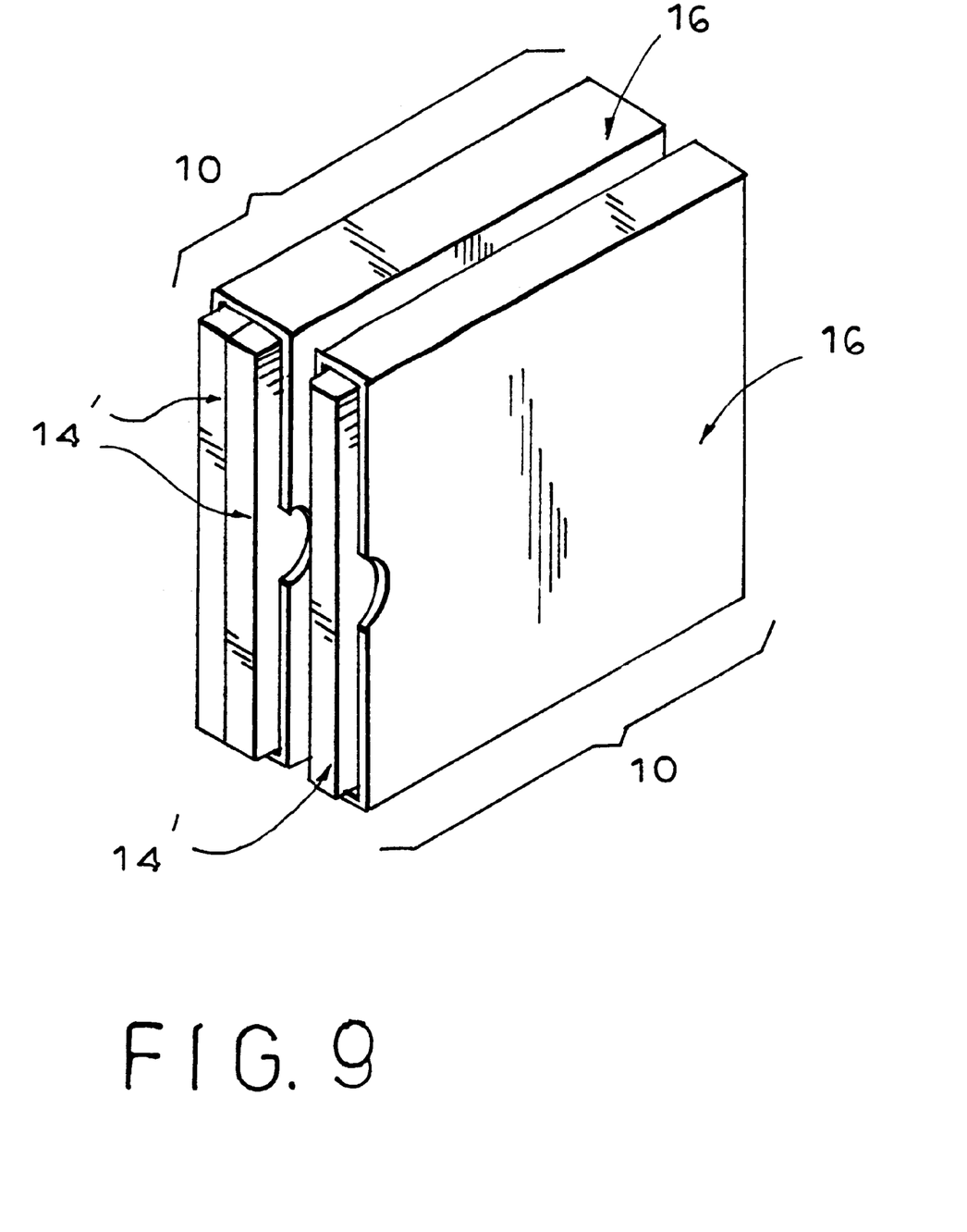
FIG. 9 is an exploded view of a modular storage system according to the present invention using the three panel folder embodiment.

The intermediate panel 40 is capable of storing at least one recording medium 12, and preferably it is configured and dimensioned to store one recording medium 12 on each face thereof. Thus each of the front and back panels 22, 24 is capable of storing one recording medium 12 on an inner face thereof, and the intermediate panel 40 is capable of storing one recording media on each outer face thereof, for a total of four recording media. Where the folder 14' is designed to accommodate a maximum of three recording media 12, one on the inner face of each of the front and back panels 22, 24 and only one on the intermediate panel 40, the design described hereinabove is satisfactory. A single slit 34 is disposed on the blank flap 40b to accommodate the single recording medium 12. In the case of the folder 14', the width of the spine 26 is selected to accommodate the combined thicknesses of the front, intermediate and back panels 22, 40, 24 plus the number of recording media 12 contemplated for storage therein (up to four recording media 12).

On the other hand, where the folder 14' is designed for holding four recording media 12 therein, an appropriate slit 34 must be made in each of the two outer faces of intermediate panel 40 (that is, blank flaps 40a and 40b) so that a recording medium 12 may be disposed on each outer face thereof. However, three problems arise with such a construction. First, when the recording media 12 are placed with their sensitive faces adjacent the intermediate panel 40, the portions of the sensitive surfaces of the two recording media 12 which have passed through their respective slits 34 face one another and can do damage to one another as one is moved relative to the other (for example, during insertion or removal of a recording medium). Second, a recording medium 12 inserted into slit 34 of blank flap 40a is not retained within the intermediate panel 40 and thus can fall out of the folder. Third, the interior of the intermediate panel 40, when defined only by the thickness of the adhesive gluing the two blank flap thicknesses together, is inadequate to allow insertion and storage of two recording media 12 without some likelihood of the intermediate panel 40 being split apart into its constituent blank flaps 40a, 40b.

Accordingly, in the folder 14' designed to store four recording media 12, an additional partial flap 42 (secured only to the free end of blank flap 40a in blank 30) is provided. The partial flap 42 is folded over the transverse foldline 32' with flap 40a so that it is disposed intermediate flaps 40a, 40b at one end of intermediate panel 40. The free end of partial flap 42 is glued (on opposite faces) to both flaps 40a and 40b, while the opposite end is glued on opposite longitudinal edges to flap 40b only. The presence of the partial flap 42 prevents the sensitive surfaces of two recording media 12 inserted into intermediate panel 40 from rubbing against one another, precludes the recording media 12 in slit 34 of flap 40a from passing all the way through the intermediate panel 40 by providing a retaining fold 32' therefor, and increases the internal thickness between the facing faces of flaps 40a, 40b (by the thickness of partial flap 42) so that there is no tearing of the intermediate panel 40 even when two recording media 12 are inserted and stored therein.

In order to achieve economies of scale, preferably the partial flap 42 is present even when the folder 14' is designed for use with only three recording media 12—that is, with only one recording medium 12 being stored in the intermediate panel 40. Indeed, for reasons of scale, preferably only one folder 14' is manufactured (with partial flap 42) and used for four, three, two or even only one recording media 12. In this instance, the folder 14' need be provided only with as many slits 34 as necessary to accommodate the contemplated number of recording media 12. Experience has shown that there is invariably sufficient printed material for profitably occupying the unused faces of the panels even when less than four recording media 12 are to be stored in the folder 14'. Of course, when partial flap 42 is present in the folder 14', the width of the spine 26 is selected to accommodate the combined thicknesses of the front, intermediate and back panels 22, 40, 24 (including the flap 42 in intermediate panel 40) plus the number recording media 12 contemplated for storage therein.

It will be appreciated that while the recording media 12 passing through slot 34 of the blank flap 40a is prevented from falling through the intermediate panel 40 by the fold 32', the recording media 12 passing through slot 34 of blank flap 40b is presented from falling through the intermediate panel 40 only by the disposition of glue 38 which binds together the partial flap 42 and the flap 40b, adjacent spine 26. While this is a preferred mechanism for limiting passage of the recording media 12 through the slots 34 of intermediate panel 40, equivalent mechanisms may be used.

To summarize, the present invention provides a modular storage system for recording media which is eco-friendly and eschews the use of plastic. The folder is book-like in appearance and in the way that the leaves are turned laterally, the folder being formed from a single longitudinally extending paperboard blank without requiring any additional material to maintain together the various leaves. The system provides apparent modularity and preferably uses substantially modular folders and substantially modular slipcases.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the forgoing specification.

I claim:

1. A modular storage system for recording media, said system comprising:

(A) at least one folder,
said folder consisting essentially of a single paperboard blank and being capable of storing therein at least one recording media;
said folder defining at least two laterally aligned panels including a front panel and a back panel, said front and back panels cooperatively contributing to define a spine directly connecting said front and back panels, each of said front and back panels being of double blank thickness, and at least one of said front and back panels being capable of storing a recording media;
all of said panels of said folder being defined exclusively by folding of said blank about foldlines, and said panels being laterally tumable like the pages of a book;
said folder being characterized by the absence of any additional member joining together said panels; and (B) at least one slipcase,
said slipcase being configured and dimensioned to store therein at least one folder.

2. The system of claim 1 wherein at least one folder defines at least three laterally aligned panels including an intermediate panel disposed intermediate said front and back panels.

3. The system of claim 2 wherein said intermediate panel is of at least double blank thickness.

4. The system of claim 3 wherein said intermediate panel is only indirectly connected to said spine.

5. The system of claim 1 wherein said spine is of only single-blank thickness.

6. The system of claim 1 wherein at least one slipcase is configured and dimensioned to store therein a plurality of said folders.

7. A modular storage system for recording media, said system comprising:

(A) at least one folder,
each said folder having orthogonal outer dimensions in common with each other folder, and each individual folder being formed from a single paperboard blank and being capable of storing therein at least one recording media;
each folder defining at least two laterally aligned panels including a front panel and a back panel, said front and back panels cooperatively contributing to define a spine directly connecting said front and back panels, each of said front and back panels being of double blank thickness, and at least one of said front and back panels being capable of storing a recording media;

said front and back panels being defined exclusively by lateral folding of said blank about transverse foldlines and said panels being laterally turnable like the pages of a book;

each folder being characterized by the absence of any additional member joining together said panels; and (B) at least one slipcase, each said slipcase having at least two perpendicular outer dimensions in common with each other slipcase, and each slipcase being configured and dimensioned to store therein at least one of said folders.

8. A modular storage system for recording media, said system comprising a plurality of said folders of claim 1 and a plurality of said slipcases of claim 1.

9. A modular storage system for recording media, said system comprising:

(A) at least one folder, said folder consisting essentially of a single paperboard blank and being capable of storing therein a plurality of recording media;

said folder defining at least three laterally aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness, at least one of said panels being capable of storing at least one recording media;

said front and back panels being defined exclusively by lateral folding of said blank about transverse foldlines, and said panels being laterally turnable like the pages of a book;

said folder being characterized by the absence of any additional member joining together said panels; and (B) at least one slipcase, said slipcase being configured and dimensioned to store therein at least one folder.

10. The system of claim 9 wherein said intermediate panel is only indirectly connected to said spine.

11. The system of claim 9 wherein said intermediate panel is capable of storing at least one recording media.

12. The system of claim 9 wherein said intermediate panel is capable of storing one recording media on each side thereof.

13. The system of claim 9 wherein each of said front and back panels is capable of storing one recording media on an inner face thereof, and said intermediate panel is capable of storing one recording media on each outer face thereof.

14. The system of claim 9 wherein said spine is of only single-blank thickness.

15. A modular storage system for recording media, said system comprising a plurality of said folders of claim 9 and a plurality of said slipcases of claim 9.

16. The system of claim 15 wherein different ones of said slipcases contain different numbers of said folders.

17. A modular storage system for recording media, said system comprising:

(A) a plurality of folders, each said folder having orthogonal outer dimensions in common with each other folder, and each individual folder consisting essentially of a single paperboard blank and being capable of storing therein at least one recording media;

each said folder defining a plurality of panels, at least one of said panels being capable of storing a recording media, and said panels being laterally turnable like the pages of a book;

each folder being characterized by the absence of any additional member joining together said panels;

(B) a plurality of slipcases, each said slipcase having at least two orthogonal outer dimensions in common with each other slipcase, and each slipcase being configured and dimensioned to store therein at least one of said folders.

18. The system of claim 17 wherein said orthogonal outer dimensions of each folder are height, width and thickness.

19. The system of claim 17 wherein said at least two orthogonal outer dimensions of each slipcase are height and width, thickness optionally varying.

20. The system of claim 17 wherein each folder defines a front panel and a back panel, said front and back panels cooperatively contributing to define a spine directly connecting said front and back panels.

21. The system of claim 17 wherein at least one of said folders is capable of storing therein a different number of recording media than at least one other of said folders.

22. The system of claim 17 wherein at least one of said slipcases is configured and dimensioned to store therein a plurality of said folders.

23. The system of claim 17 wherein at least one of said slipcases has a third orthogonal outer dimension different from a third orthogonal outer dimension of at least one other of said slipcases.

24. The system of claim 17 wherein each individual folder is being capable of storing therein a plurality of recording media; each folder defining at least three laterally aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness; and said panels being defined exclusively by folding of said blank about foldlines.

25. A modular storage system for recording media, said system comprising:

(A) a plurality of folders, each said folder having orthogonal outer dimensions in common with each other folder, and each individual folder being formed from a single paperboard blank and being capable of storing therein at least one recording media;

each folder defining a plurality of panels, at least one of said panels being capable of storing a recording media, and said panels being laterally turnable like the pages of a book;

each folder being characterized by the absence of any additional member joining together said panels;

said panels being defined exclusively by lateral folding of said blank about transverse foldlines;

(B) a plurality of slipcases, each said slipcase having at least two perpendicular outer dimensions in common with each other slipcase, and each slipcase being configured and dimensioned to store therein at least one of said folders.

26. A modular storage system for recording media, said system comprising:

(A) at least one folder, said folder consisting essentially of paperboard and being capable of storing therein at least one recording media;

said folder defining at least two laterally aligned panels including a front panel and a back panel, said front and back panels cooperatively contributing to define a spine directly connecting said front and back panels, each of said front and back panels being of double blank thickness, and at least one of said front and back panels being capable of storing a recording media;

said front and back panels being defined exclusively by folding of said blank about foldlines, and said panels being laterally turnable like the pages of a book;

said folder being characterized by the absence of any additional member joining together said panels; and (B) at least one slipcase,
said slipcase being configured and dimensioned to store therein at least one folder.

27. The system of claim 26 wherein at least one folder defines at least three laterally aligned panels including an intermediate panel disposed intermediate said front and back panels.

28. (New) The system of claim 27 wherein said intermediate panel is of at least double blank thickness.

29. The system of claim 28 wherein said intermediate panel is only indirectly connected to said spine.

30. The system of claim 26 wherein said spine is of only single-blank thickness.

31. The system of claim 26 wherein at least one slipcase is configured and dimensioned to store therein a plurality of said folders.

32. A modular storage system for recording media, said system comprising:

(A) at least one folder,
said folder consisting essentially of paperboard and being capable of storing therein at least one recording media;

said folder defining at least two laterally aligned panels including a front panel and a back panel, said front and back panels cooperatively contributing to define a spine directly connecting said front and back panels, each of said front and back panels being of double blank thickness, and at least one of said front and back panels being capable of storing a recording media;

said front and back panels being defined exclusively by lateral folding of said blank about transverse foldlines, and said panels being laterally turnable like the pages of a book;

said folder being characterized by the absence of any additional member joining together said panels; and (B) at least one slipcase,
said slipcase being configured and dimensioned to store therein at least one folder.

33. A modular storage system for recording media, said system comprising a plurality of said folders of claim 26 and a plurality of said slipcases of claim 26.

34. A modular storage system for recording media, said system comprising:

(A) at least one folder,
said folder consisting essentially of paperboard and being capable of storing therein a plurality of recording media;

said folder defining at least three aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness, at least one of said panels being capable of storing at least one recording media;

said front and back panels being defined exclusively by lateral folding of said blank about transverse foldlines, and said panels being laterally turnable like the pages of a book;

said folder being characterized by the absence of any additional member joining together said panels; and (B) at least one slipcase,
said slipcase being configured and dimensioned to store therein at least one folder.

35. The system of claim 34 wherein said intermediate panel is only indirectly connected to said spine.

36. The system of claim 34 wherein said intermediate panel is capable of storing at least one recording media.

37. The system of claim 34 wherein said intermediate panel is capable of storing one recording media on each side thereof.

38. The system of claim 34 wherein each of said front and back panels is capable of storing one recording media on an inner face thereof, and said intermediate panel is capable of storing one recording media on each outer face thereof.

39. The system of claim 34 wherein said spine is of only single-blank thickness.

40. A modular storage system for recording media, said system comprising a plurality of said folders of claim 34 and a plurality of said slipcases of claim 34.

41. The system of claim 40 wherein different ones of said slipcases contain different numbers of said folders.

42. A modular storage system for recording media, said system comprising:

(A) a plurality of folders,
each said folder having orthogonal outer dimensions in common with each other folder, and each individual folder consisting essentially of paperboard and being capable of storing therein a plurality of recording media;

each folder defining at least three aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness, at least one of said panels being capable of storing at least one recording media;

said panels being defined exclusively by folding of said blank about foldlines, and said panels being laterally turnable like the pages of a book;

each folder being characterized by the absence of any additional member joining together said panels; and (B) a plurality of slipcases,
each said slipcase having at least two orthogonal outer dimensions in common with each other slipcase, and each slipcase being configured and dimensioned to store therein at least one of said folders.

43. A modular storage system for recording media, said system comprising:

(A) a plurality of folders,
each said folder having orthogonal outer dimensions in common with each other folder, and each individual folder consisting essentially of paperboard and being capable of storing therein at least one recording media;

each folder defining a plurality of panels, at least one of said panels being capable of storing a recording media, and said panels being laterally turnable like the pages of a book;

each folder being characterized by the absence of any additional member joining together said panels;

(B) a plurality of slipcases, each said slipcase having at least two perpendicular outer dimensions in common with each other slipcase, and each slipcase being configured and dimensioned to store therein at least one of said folders.

44. The system of claim 42 wherein said orthogonal outer dimensions of each folder are height, width and thickness.

45. The system of claim 42 wherein said at least two orthogonal outer dimensions of each slipcase are height and width, thickness optionally varying.

46. The system of claim 43 wherein said orthogonal outer dimensions of each folder are height, width and thickness.

47. The system of claim 43 wherein said at least two orthogonal outer dimensions of each slipcase are height and width, thickness optionally varying.

48. The system of claim 43 wherein each folder defines a front panel and a back panel, said front and back panels cooperatively contributing to define a spine directly connecting said front and back panels.

49. The system of claim 43 wherein at least one of said folders is capable of storing therein a different number of recording media than at least one other of said folders.

50. The system of claim 43 wherein at least one of said slipcases is configured and dimensioned to store therein a plurality of said folders.

51. The system of claim 43 wherein at least one of said slipcases has a third perpendicular outer dimension different from a third perpendicular outer dimension of at least one other of said slipcases.

52. The system of claim 43 wherein each individual folder is being capable of storing therein a plurality of recording media; each folder defining at least three laterally aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness; and said panels being defined exclusively by folding of said blank about foldlines.

53. A modular storage system for recording media, said system comprising:

(A) a plurality of folders, each said folder having orthogonal outer dimensions in common with each other folder, and each individual folder consisting essentially of paperboard;

each individual folder being capable of storing therein a plurality of recording media; each folder defining at least three laterally aligned panels consisting of a front panel, a back panel and at least one intermediate panel disposed intermediate said front and back panels, said front and back panels cooperatively defining a spine directly connecting said front and back panels, each of said front and back panels being of double blank thickness and said intermediate panel being of at least double blank thickness; and said front and back panels being defined exclusively by lateral folding of said blank about transverse foldlines;

at least one of said panels being capable of storing a recording media, and said panels being laterally turnable like the pages of a book;

each folder being characterized by the absence of any additional member joining together said panels;

(B) a plurality of slipcases, each said slipcase having at least two perpendicular outer dimensions in common with each other slipcase, and each slipcase being configured and dimensioned to store therein at least one of said folders.

54. The system of claim 43 wherein each folder defines at least two laterally aligned panels including a front panel and a back panel, said front and back panels cooperatively contributing to define a spine directly connecting said front and back panels, each of said front and back panels being of double blank thickness, and at least one of said front and back panels being capable of storing a recording media; said front and back panels being defined exclusively by lateral folding of said blank about transverse foldlines.

* * * * *